United States Patent [19]

Mayfield

[11] Patent Number: 5,853,778
[45] Date of Patent: Dec. 29, 1998

[54] FOOD PRODUCTS UTILIZING EDIBLE FILMS AND METHOD OF MAKING AND PACKAGING SAME

[75] Inventor: Walter Goldston Mayfield, Houston, Tex.

[73] Assignee: Arriba Corporation, Houston, Tex.

[21] Appl. No.: 790,656

[22] Filed: Jan. 29, 1997

[51] Int. Cl.[6] ............................ A21D 13/00; A23L 1/325
[52] U.S. Cl. ............................ 426/89; 426/138; 426/573; 426/576; 426/577; 426/633; 426/643; 426/644
[58] Field of Search ............................ 426/89, 138, 140, 426/573, 576, 577, 632, 633, 643, 644

[56] References Cited

U.S. PATENT DOCUMENTS

| | | | |
|---|---|---|---|
| 3,634,098 | 1/1972 | Rhoades | 99/140 R |
| 3,772,038 | 11/1973 | Ayres et al. | 99/128 |
| 4,275,083 | 6/1981 | Colten et al. | 426/96 |
| 4,369,885 | 1/1983 | Redmond | 206/484 |
| 4,710,228 | 12/1987 | Seaborne et al. | 106/218 |
| 4,820,533 | 4/1989 | Seaborne et al. | 426/76 |
| 4,874,618 | 10/1989 | Seaborne et al. | 426/76 |
| 4,915,971 | 4/1990 | Fennema et al. | 426/578 |
| 5,019,403 | 5/1991 | Krochta | 426/89 |
| 5,130,151 | 7/1992 | Averbach | 426/99 |
| 5,312,641 | 5/1994 | Castillo, Jr. | 426/633 |
| 5,376,388 | 12/1994 | Meyers | 426/5 |
| 5,384,170 | 1/1995 | Bastioli et al. | 428/34.1 |
| 5,401,518 | 3/1995 | Adams et al. | 426/89 |
| 5,622,740 | 4/1997 | Miller | 426/138 |

OTHER PUBLICATIONS

S. Guilbert "Technology and Application of Edible Protective Films." *Food Packaging and Preservation Theory and Practice* p. 372–394.

R. King, et al. "Tablets, Capsules, and Pills." *Remington's Pharmaceutical Science* Chapter 89, (1553–1593) (1980).

*Primary Examiner*—Nina Bhat
*Attorney, Agent, or Firm*—Madan & Morris, PLLC

[57] ABSTRACT

An edible material thin file is applied to sticky or moist food products. The edible material may be sprayed on the moist food product. The food product with the edible material thereon may be used make sandwiches or stored without any additional protection. Individually wrapped slices of the moist food product may be further wrapped in plastic films, boxed and transported. Sandwiches utilizing the moist food products with the edible material thereon may be made and stored and sold in convenience store, grocery stores and the like.

12 Claims, 1 Drawing Sheet

5,853,778

FOOD PRODUCTS UTILIZING EDIBLE FILMS AND METHOD OF MAKING AND PACKAGING SAME

BACKGROUND OF THE INVENTION

1. Field Of The Invention

This invention relates generally to packaging of food products and more particularly to coating amorphous food products with an edible film that enables such food products to retain their shape so that they may be handled with ease for later use or packaged for commercial shipment.

2. Description Of The Related Art

A variety of techniques and materials have been utilized for the packaging of various types of food products and medicine. Food packaging generally provides for the storage, shipping, and handling of food products. Consumer demand for easily-prepared and ready-to-eat foods has sparked much innovation in the food packaging industry. Several patents have issued relating to various aspects of packaging of food products.

U.S. Pat. No. 4,369,885, issued to Redmond, discloses a sealed package particularly adapted for storing, shipping, handling, and for supporting for use, after the cover is peeled off, an individual portion of a spreadable product such as butter, margarine, peanut butter and the like. The package comprises a stiff base member covered by a flexible sheet with the food product therebetween. Redmond's invention provides a package for containing a single serving of a semisolid food, but does not address the use and handling of the food outside of its non-edible package.

U.S. Pat. No. 5,31 2,641, issued to Castillo, discloses a non-spread, sliced peanut butter product containing chunky peanut butter, powdered egg white, flour, and an emulsifier. The ingredients are mixed together, pressed or extruded into sheets which are separated by waxed paper into pieces the size of a bread slice and about 0.2 inches thick. Castillo, Jr.'s invention provides a composition and texture different from that of conventional peanut butter.

U.S. Pat. No. 4,275,083, issued to Colten et al., discloses a storage-stable confection which does not require moisture-resistant packaging. The confection is prepared by dispersing granulated gasified candy in a matrix of flavored oleaginous material or by enrobing the confection with a layer of flavored oleaginous material. The confection provides the sense or organoleptic effects of sizzle combined with the taste of fruit, chocolate, peanut butter or carbonated beverage. The resultant confection is a solid.

U.S. Pat. No. 4,710,228, issued to Seaborne et al., discloses edible film coating compositions of low moisture permeability and their methods of preparation. The compositions comprise cross-linked, refined shellac and preferably an edible member having a reactive hydroxyl or acid moiety selected from the group consisting of edible sources of polyphenolics, edible sources of benzaldehyde and derivatives, acetylated monoglycerides and other edible chemical compounds. Shellac is cross-linked with the reactants in a dry, molten mixture by heating. The molten mixture is dissolved in a food grade solvent, applied to a substrate and dried. The coating is useful as a moisture barrier in composite food articles having phases in contact which differ substantially in water activity.

U.S. Pat. No. 4,915,971, issued to Fennema et al., discloses an edible film for retarding water transfer among components of a multicomponent food product. The film includes a base film having a hydrophilic polymer layer and a base film lipid layer. The base film lipid layer has a hydrophobic surface presented away from the hydrophilic polymer layer. An additional lipid layer is laminated to the hydrophobic surface of the base film lipid layer. The invention further includes a method for making the edible film and a food product incorporating it.

U.S. Pat. No. 5,401,518, issued to Adams et al., discloses an emulsion which provides an edible moisture barrier coating for foods. The emulsion is prepared by homogenizing an aqueous solution of a protein isolate and a mixture of a saturated lipid and emulsifier. The emulsion is coated onto a food product and cold-set using refrigeration, where the coating serves as a moisture barrier. It appears that the coating does not provide a film for handling a non-frozen, sticky, semisolid food products, such as peanut butter, jam or jelly, spreads made for sandwiches, such as certain cheese spreads, vegetable spreads and the like.

U.S. Pat. No. 5,130,151, issued to Averbach, discloses a method of making an edible moisture barrier consisting essentially of oleaginous material and wax. At least a portion of the oleaginous material is synthetic. This patent contemplates applying the barrier as a molten solution to a food product surface, cooling rapidly to form a continuous that prevents the migration of moisture into, out of, or between components of the food products.

A large number of moist and sticky food products, such as peanut butter, jelly, tuna fish salad, chicken salad, egg salad, pimento salad, etc. (herein generally referred to a "amorphous" food products), are utilized to make sandwiches every day. Such food products are typically packaged in container from which they are directly applied on bread slices to make sandwiches. Frequently, such sandwiches are stored for a period of time before they are consumed. For example, children take such sandwiches for eating at lunch time, which may be a few hours after such sandwiches are prepared. Sandwiches made with tuna salad, chicken salad, pimento salad and meat slices, tomatoes and other condiments are stored in refrigerated sections in stores for sale, which may occur from several hours to a couple of days after such sandwiches have been prepared. The moisture from such sandwich materials penetrate into the bread slices, which alters the taste and texture of the bread. Additionally, none of the above-described and other types of sticky and moist or amorphous food products is commercially available in individually wrapped slices, like cheese slices, are commonly available in ordinary grocery stores. It will be very useful to provide such materials in ready-to-use shapes, such as slices, that will retain their shapes and will not allow the moisture from such food products to transfer to the food materials (e.g. bread) to which they are applied.

Consumers will prefer that certain types of commonly used amorphous food products food products, especially peanut butter and jelly, are commercially available in forms which can be readily used to make sandwiches. Additionally, it will be desirable to make available films of edible material that can be placed between the bread and the desired amorphous food products, wherein the edible film will not alter the taste of the amorphous food products and will not allow the moisture from the amorphous food products to transfer to the outer material, thereby allowing the prepared sandwiches to be stored for longer periods of time. The amorphous food products with edible film would be easier to handle and easier to use compared to using such products out of containers. Consumers also want packaging that will present such food products as individual slices that will retain the taste and flavor of such food products.

Further, it is highly desirable to package such and other sticky food products in a manner that the packaged products will retain their shape and will be readily utilized to make sandwiches without affecting the original texture of the bread of the sandwich when stored for a period of time. Thus, there remains a need for preparing and packaging such sticky edible products in manners which would allow easy handling of such products and will not permit transfer of moisture from such products to other products which come in contact with such sticky products. None of the above-noted patents discloses specific manners of applying edible films to food products for making sandwiches or making slices of such materials with edible films thereon for later use in sandwiches.

The present invention addresses some of the above-noted problems and needs relating generally to the handling and use of sticky food products and provides methods of coating and/or covering such food products with edible, substantially non-sticky materials for use during preparation of such food products and methods for packaging such coated food products for long term storage, shipping and handling of such food products.

SUMMARY OF THE INVENTION

The present invention provides a method of making an edible material and the application thereof to sticky or moist food products. The edible material may be sprayed on the moist food product. The food product with the edible material thereon may be used make sandwiches or stored without any additional protection. Individually wrapped slices of the moist food product may be further wrapped in plastic films, boxed and transported. Sandwiches utilizing the moist food products with the edible material thereon may be made and stored and sold in convenience store, grocery stores and the like.

Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DETAILED DESCRIPTION OF THE PREFERRED EMBODIMENT

The present invention provides a method of making an edible film and a method of utilizing such edible film with various food products. Under food-preparation conditions, an edible film is made by mixing 1.5 to 3.0 teaspoons of a gelling substance such as gelatin, pectin, or agar to 1.5 cups of purified water to form a solution. The quantity proportions should be held between 24 and 48 parts of water per part of the gelling substance. The solution is heated until a gelled solution is created. The gelled solution is poured into a long, narrow substantially flat surface container to form a relatively thin film. The container may have dimensions of 100 ft long by 8 in. wide. The size of the container should be adjusted to form a thin film, preferably less than 1 mm thick. The film formed is preferably about as thick as a sheet of ordinary copier or printer paper. Prior to pouring the gelled solution into the container, the container is preferably coated with hydrogenated vegetable oil to prevent the resulting film from sticking to the pan.

The gelled solution is dried in the container, forming an edible film. The gelled solution may dry by natural evaporation, preferably in an environment having warm, dry air. Air temperature is preferably maintained at less than 95° F. After the gelled solution is dry and a relatively strong, paper-thin film is formed, the exposed side of the film is lightly coated with hydrogenated vegetable oil. Since the container is also coated with hydrogenated vegetable oil, both sides of the film are coated with the hydrogenated vegetable oil. The coatings of oil enhance the moisture barrier and help to preserve the integrity of the film when it comes in contact with other materials. Alternatively, other edible films having enhanced moisture impermeability properties may be used. The edible film is preferably clear, odorless, and tasteless. The film is cut into useable sizes for wrapping desired food products. Such a film does not appreciably alter the texture or the taste of food products wrapped in such film. Food products containing an outer layer of such edible film can be handled with greater ease and used as sandwich filler materials.

In application, an amorphous food, such as peanut butter, jam, sandwich spread, pate, etc., is spread with the edible film. Alternatively, different food products, such as peanut butter and jelly may be first stacked in layers and the resulting food product may be wrapped in the edible material in any desired manner.

Figure 1A:
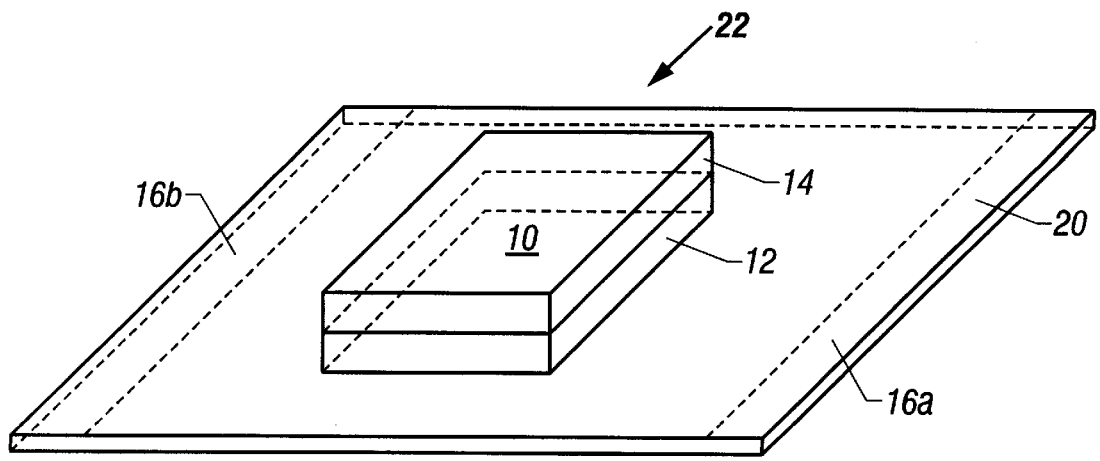
FIG. 1A is a perspective view of a substantially sticky food product being wrapped in an edible film for later use or packaging of the product into containers having multiple wrapped products according an embodiment of the present invention.
Figure 1B:
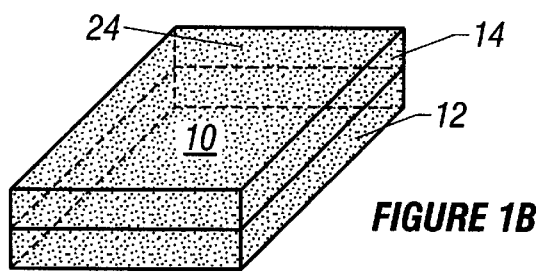
FIG. 1B is a perspective view of a first substantially sticky food product sprayed with a substantially non-sticky edible material for further use according to one embodiment of the present invention.

FIGS. 1A and 1B show examples of two methods of applying the edible film on amorphous food products. FIG. 1A shows a food product 10 to be wrapped in a layer of an edible material 20. In the example of FIG. 1A, the food product contains a layer (sheet) 14 of one food item placed on a layer 12 of a second food item. The food items 12 and 14 may be any desired items. For example, food item 12 may be peanut butter and food item 14 may be a fruit preserve. Alternatively, food item 12 may be slices of a meat and layer 14 may be composed of condiments, cheese and other materials commonly used for making sandwiches. It should be obvious that for the purpose of this invention, food product 10 may be comprised of any desired food materials. Further, the food product 10 may have any number of layers and any number of different edible materials.

The desired food product is placed on a sheet or film 20 of the edible material. The sheet 20 is then wrapped over the food product 10 in any desired manner. The wrapped food product 22 essentially has an outer shell made from the relatively thin edible film 20. If the food product 10 is a sticky substance, such as peanut butter or peanut butter and jelly or other sandwich materials, such as egg salad, chicken salad, tuna fish salad, etc., then the edible film 20 prevents the product from sticking with the storage medium in which it is placed, such as a container or a box. The edible material layer 20 further reduces seepage of moisture from the product 10 to the storage medium. This method allows stacking of several individually wrapped products in a storage medium or refrigerator. Individually wrapped items can later be used to form sandwiches or used in any other desired manner.

FIG. 1B shows an alternative manner of applying the non-sticking edible material of the present invention on food products. For convenience, the food products to be wrapped in the edible film are shown to be the same as in FIG. 1A. Instead of forming a film 20 as shown in FIG. 1A, the gelled edible material described earlier or any other suitable edible material in a liquid or gelled form may be sprayed, as shown by numeral 24 on the food product 10. Any suitable method to spray or to apply the edible material 24 on any desired food product may be utilized for the purposes of this invention. The individual slices of the food product having the edible film or layer thereon may be further wrapped in plastic sheets and packaged in boxes or containers, similar to the manner by which individual cheese slices are wrapped and sold in grocery stores.

Following is an example of making a single slice of food product for use in a sandwich. For food products such as peanut butter, the edible film or layer is preferably about 8 inches wide, and the peanut butter is spread preferably in a layer about 4 inches wide. For peanut butter as the first food, the layer is preferably between 1 and 10 mm thick, but may vary, depending upon the application. A second food, such as jelly, preserves, or jam, may be spread on the peanut butter. This example provides a peanut butter and jelly slice, but is merely one embodiment of the present invention. The food-free edges are wrapped over the peanut butter and jelly. The food-free edges are overlapped and sealed together, sealing the peanut butter and jelly within. A long, thin slice about four (4) inches wide of peanut butter and jelly is formed.

A lubricant powder, such as pectin, can be used on the edible film, and a non-lipid sealant may be used to seal edges, such as edges 16a and 16b (FIG. 1A) of the edible film together. The lubricant powder prevents the edible film from sticking to itself, except where sealed together. The edible film may be sealed with albumin and/or water, and cornstarch may be used as a lubricant to prevent the edible film from sticking to itself. However, the lubricant powder and the nonlipid sealant provide a sealed edible film that is lower in fat, cholesterol, and calories than a film using cornstarch and albumin.

To form an individual sandwich-size of about 4 in. by 4 in., a press blade is pressed down on the long, thin slice to seal the film together about every 4 in. A cutting blade is used to cut off 4 in. by 4 in. slices by cutting at the seals made by the press blade. A completely sealed, sandwich-size slice results. The sandwich-sized slice is about 4 in. long by 4 in. wide and has a thickness suitable for making a sandwich. Although the sandwich-sized slice is sealed in a film, the food and film may be eaten together because the film is edible. Preferably, the film dissolves immediately when eaten and either provides no flavor or an agreeable flavor. For mass production, each sandwich-sized slice is wrapped and sealed in a non-edible plastic film to provide single-slice servings. Alternatively, a separator sheet may be placed between the sandwich-sized slices forming a stack which may be packaged in a non-edible plastic packaging or other suitable packaging.

The above-described sandwich-sized food products may be handled without contacting the amorphous first and second foods sealed inside. Thus, amorphous first and second foods, even messy, sticky foods like peanut butter and jelly, may be conveniently handled. Since the film used is edible, the sandwich-sized slice may be used to cleanly and conveniently make a sandwich using slices of sandwich bread. Further, since the edible film provides a moisture barrier, the sandwich bread does not become soggy.

In another embodiment, a long strip of an edible film may be made and rolled onto a roll. Like a conventional roll of a non-edible plastic film, the roll of edible film may be sold for use in homes and other establishments where food is prepared. The edible film is used as a moisture barrier between a moist food and a dry food. For example, a sandwich is prepared by placing the edible film on two slices of bread and sandwiching a moist food between the slices of bread such that the edible film is between the moist food and the bread. The edible film prevents sogginess in the bread, improving the appeal of the sandwich and increasing its shelf life. The edible film may be scored or perforated so that lengths of the film may be torn off easily.

The present invention provides a method of making a food product. An edible film is prepared and rolled onto a roll. The roll is operatively mounted above a moving conveyor belt so that the edible film unrolls and moves with the conveyor belt. A food, such as peanut butter and jelly, is spread on the edible film as the edible film moves along on the conveyor belt. An apparatus wraps, cuts, and seals the food to form a food product by mass production. The food product includes the food sealed in the edible film. The food product is packaged for transport and display.

The present invention provides a method for freezing and packaging a food in an edible film. A sandwich material is spread onto a moving conveyor belt to form a thin continuous strip of the sandwich material. The sandwich material is passed through a freezing section, where the sandwich material is frozen. The frozen sandwich material is passed through a cutting section, where the sandwich material is cut into sandwich-sized slices of approximately four inches by four inches. The frozen and cut sandwich material is passed through a wrapping section, where the sandwich material is wrapped and sealed in an edible film. Alternatively, the sandwich material may be sealed in an edible film by spraying, dipping, or coating as described below. The sealed sandwich material is wrapped in a packaging for transport and display, packaging individual sandwich-sized servings. A separator sheet, such as a cardboard, may be placed between the individual servings from the packaging.

Alternatively, the desired food is spread onto a moving conveyor belt to form a thin continuous strip of the food. An edible film is formed directly on the food by spraying a liquid or an atomized liquid on the food. The sprayed liquid is dried, leaving the food coated in an edible film. Rather than spraying the liquid, the food may be dipped into the liquid and dried to form the edible film. The liquid may also be poured onto the food and dried to make the edible film. After the continuous strip of food is coated with the edible film, the coated food is passed through a pressing and sealing step to seal the coated food into sealed portions. The sealed portions are passed through a cutting step, forming cut and sealed portions. The cut and sealed portions are packaged for transport and display.

In another embodiment the present invention provides a bubble package for food. An edible film is formed and dried in a container to provide a food container in a dish shape, meaning open on a top surface, but enclosed on bottom and side surfaces. Food is placed in the edible food container, sealing the food within and forming a combined edible and non-edible food container. The combined edible and non-edible food container is packaged for transport and display. A consumer purchases the food, unpackages it, removes the non-edible sheet of packaging from the food and edible film and eats the food and the edible film.

The present invention provides a method of making a sandwich. Sandwiches are frequently made for consumption after a delayed period of time. Examples include sandwiches made at home for consumption at lunch away from home, sandwiches made by a restaurant for delivery or take-out service, and sandwiches packaged and displayed in a grocery or convenience store for subsequent sale to a consumer. A sandwich is made by placing a first slice of bread on a work surface, placing a first edible film on the first slice, placing a sandwich filler on the edible film. placing a second edible film on the sandwich filler, and placing a second slice of bread on the second edible film to form a sandwich. The first and second edible films provide a moisture barrier that aids in preventing sogginess of the bread.

Figure 2:
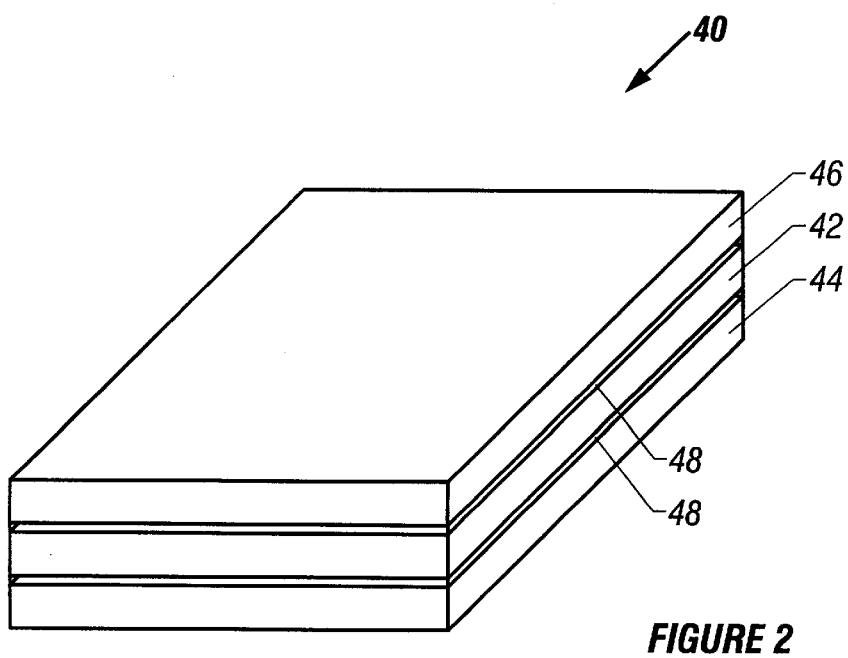
FIG. 2 is a perspective view of a sandwich having an amorphous filler enclosed and sealed in an edible film, forming a slice according to the present invention.

With references to FIG. 2, a sandwich 40 is shown in perspective. A sandwich filler 42 is sandwiched between a first slice 44 of bread and a second slice 46 of bread. An edible film 48 encloses and seals an amorphous, semisolid food within. The edible film 48 provides a moisture barrier around the amorphous, semi-solid food. As a moisture barrier, the edible film 48 reduces sogginess in the first and second slices of bread 44. The edible film 48 allows one to handle the amorphous, semi-solid food without contact with the amorphous, semi-solid food, which may be sticky and messy.

The present invention provides an edible film for packaging of semi-solid foodstuffs and/or pharmaceutical substances. When wrapped in the edible film, the semi-solid foodstuffs are easily handled without one's hands becoming messy and sticky. Peanut butter and jelly slice may be placed between slices of bread without any mess or clean-up.

Numerous examples can be provided of foods and/or edible films according to the present invention. A slice of peanut butter is one example. The peanut butter has the taste, texture, and consistency of conventional peanut butter packaged in a jar, but is enclosed and sealed in edible film. Another example is lettuce and/or tomato wrapped and sealed in edible film. In the past sandwiches preferably had lettuce and/or tomato separate from bread until consumption was imminent. The present invention allows the lettuce and/or tomato to be wrapped in edible film and placed on the bread for a sandwich, where both lettuce and/or tomato and the bread stay fresh for a longer period of time. Condiments, such as mayonnaise, mustard, ketchup, and relish can be packaged in an edible film. The condiment wrapped in edible film may be used at subsequent time on a sandwich or the like. Pita bread, croissants, and open-faced sandwiches are all potential applications for the present invention. An example of using an edible film as a moisture barrier is with a cheese and cracker sandwich, where the edible film provides a moisture barrier between the cheese and the crackers, preventing sogginess and/or staleness in the cracker.

In summary, the present invention provides a sandwich having a food filler sealed in an edible film, the edible film providing a moisture barrier to prevent sogginess in the bread and allow clean handling of the food filler. Thus, the food filler may thus be handled without a mess since it is wrapped in the edible film. In addition the present invention provides an edible film and various methods of making the edible film. The present invention also provides various methods for packaging food in edible film. Because the film is edible, it is environmentally friendly.

The foregoing description is directed to a particular embodiment of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A food product, comprising:
   (a) an amorphous food made into a desired shape; and
   (b) a flexible film of edible material at a thickness less than 1.0 mm on opposite sides the amorphous food for
      (i) aiding the amorphous food to retain moisture, and
      (ii) aiding the amorphous food in maintaining the desired shape.

2. The food product according to claim 1, wherein the desired shape of the amorphous food is suitable for use in a sandwich.

3. The food product according to claim 1, wherein the amorphous food is selected from the group consisting of (i) peanut butter, (ii)jelly, (iii) tuna fish salad, (iv) egg salad, (vi) chicken salad, (vii)sandwich spread, and (viii) pimiento salad and the desired shape is a layer of a predetermined thickness.

4. The food product according to claim 1, wherein the amorphous food comprises at least two layers of different amorphous foods.

5. The food product according to claim 4, wherein the at least two layers include a layer of peanut butter and a layer of a fruit-based product.

6. The food product of claim 1, wherein the amorphous food is of kind that sticks to products selected from a group consisting of (a) bread and (b) cracker.

7. The food product according to claim 1, wherein the edible material is a gel sprayed on the amorphous food product to form a film.

8. The food product according to claim 1 further comprising a non-edible film wrapped around edible film for storing the food product.

9. A sandwich, comprising:
   (a) a slice of edible material including:
      (i) an amorphous food material made into a desired shape;
      (ii) a flexible film of an edible material having a thickness less than 1.0 mm disposed on opposite sides of the amorphous food material for aiding the amorphous material to retain the desired shape; and
   (b) an outer sandwich material disposed on opposite sides of the slice of edible material to form the sandwich.

10. The sandwich according to claim 9, wherein the outer sandwich material is selected from a group of edible products consisting of (bread), (b) pita bread, (c) tortilla and (d) crackers.

11. The sandwich according to claim 10, wherein the amorphous food is selected from a group consisting of (a) peanut butter, (b) fruit-based food product, (c) cheese, (d) chicken salad, (e) meat-based sandwich materials, (f) poultry-based sandwich materials, (g) dairy products-based materials, and (h) vegetable-based materials.

12. The food product according to claim 9, wherein the amorphous food is selected from the set consisting of (i) peanut butter, (ii) jelly, (iii) tuna fish salad, (iv) egg salad, (vi) chicken salad, (vii) sandwich spread, and (viii) pimiento salad and the desired shape is a layer (sheet) of a predetermined thickness.

* * * * *